(12) United States Patent
Schwab et al.

(10) Patent No.: US 7,153,465 B1
(45) Date of Patent: Dec. 26, 2006

(54) METHOD OF PRODUCING HYBRID TUBULAR METAL/CERAMIC COMPOSITES

(75) Inventors: Stuart T. Schwab, Albuquerque, NM (US); Kevin W. Dudek, Albuquerque, NM (US)

(73) Assignee: Thor Technologies, Inc., Albuquerque, NM (US)

(*) Notice: Subject to any disclaimer, the term of this patent is extended or adjusted under 35 U.S.C. 154(b) by 290 days.

(21) Appl. No.: 10/764,662

(22) Filed: Jan. 26, 2004

Related U.S. Application Data

(63) Continuation-in-part of application No. 09/929,873, filed on Aug. 14, 2001, now Pat. No. 6,699,810.
(60) Provisional application No. 60/442,932, filed on Jan. 27, 2003.

(51) Int. Cl.
*H05B 6/64* (2006.01)
*C04B 35/00* (2006.01)

(52) U.S. Cl. .................. 264/430; 264/432; 264/624
(58) Field of Classification Search ................ 264/430, 264/432, 624
See application file for complete search history.

(56) References Cited

U.S. PATENT DOCUMENTS 5,459,114 A * 10/1995 Kaya et al. ................. 501/95.2
5,464,918 A * 11/1995 Schwark ...................... 528/24

\* cited by examiner

*Primary Examiner*—Carlos Lopez
(74) *Attorney, Agent, or Firm*—John L. Sigalos; Peacock Myers, P.C.

(57) ABSTRACT

There are disclosed inventions relating to tubular hybrid metal/ceramic composites and the methods of making them wherein the ceramic chosen has a lower thermal expansion than that of the metal.

18 Claims, 1 Drawing Sheet

METHOD OF PRODUCING HYBRID TUBULAR METAL/CERAMIC COMPOSITES

CROSS REFERENCE TO RELATED APPLICATION

The present invention is a continuation-in-part of U.S. application Ser. No. 09/929,873, filed Aug. 14, 2001 now U.S. Pat. No. 6,699,810, and a complete application based on Provisional Application 60/442,932 filed Jan. 27, 2003, the entirety of which are specifically incorporated herein by reference.

BACKGROUND OF THE INVENTION

The parent application relates to the use of high frequency microwave (HFMW) radiation in the form of a beam to make hybrid tubular metal/ceramic composites and to the resultant products. It relates particularly to the combination of preceramic polymer infiltration with high frequency microwave pyrolysis referred to as "PIMP" processing.

Ceramic composites, such as continuous fiber-reinforced ceramic composites (CFCCs), are inherently wear and erosion resistant, retain strength at higher temperatures and are lighter in weight than competing metals. Many applications, ranging from turbine engines and rocket nozzles to gun barrels require repeated or extended exposure to aggressive gaseous species at high temperature and pressure to form such products.

The composites formed have to be combined with other materials, such as metallic elements, and parts to form the final product, such as a turbine engine. Ceramics, including ceramic composites, are inherently brittle, while metals are inherently ductile. These inherent properties render the attachment of ceramics and ceramic composites to metal structures problematic.

Development of effective methods of processing of CFCCs has been a subject of intense investigation for over 15 years, and several approaches with potential for industrial utilization have been identified. While chemical vapor infiltration (CVI) technology is currently viewed as the industry leader, it is a slow, complex process with many inherent difficulties, including a corrosive gas environment, a high cost for process tooling and a substantial amount (15–25%) of residual porosity. Although some of these issues have been mitigated by new CVI methods, few metals can tolerate the highly corrosive CVI atmosphere, and those that can (e.g., tungsten alloys) have very high specific gravities, adding substantial weight to the structure.

This is particularly true of products in which the metal is in the form of tubes. Currently, three basic methods are used to produce actively cooled CFCC components: i) heavy, refractory metal tubes are co-processed with the CFCC; ii) metal tubes are brazed to the CFCC; or iii) a very dense matrix CFCC is processed with cooling passages into which a metal liner may or may not be inserted. All three approaches suffer from substantial shortcomings.

In addition to new methods of producing fiber-reinforced ceramics, simple, rapid and reliable methods of attaching the CFCC to the metal support structure are needed. Although fiber-reinforced ceramics are much less brittle than their monolithic counterparts, they are not ductile like metal components. In addition, dense ceramics and ceramic composites are difficult to machine. For these and other reasons, conventional attachment strategies are inadequate. The attachment issue could be simplified greatly if metallic features, such as attachment lugs, could be co-processed as an integral part of the ceramic component.

Polymer infiltration/pyrolysis (PIP) processing is a new method of manufacturing CFCCs that is a simple extension of the traditional methods used to manufacture carbon—carbon and polymer-matrix composites. PIP processing is inherently compatible with the intelligent manufacturing techniques currently under development for polymer matrix composites, and has been shown to yield CFCCs with properties equal or superior to those produced by other methods. It is currently practiced by a number of firms using conventional pyrolysis methods. However, because of the change in density associated with the conversion of the matrix precursor to the finished ceramic, repeated infiltration/firing cycles are required to produce a dense finished ceramic product. Economic models developed as part of the DARPA Low Cost Ceramic Composites ($LC^3$) Program indicate that more than 30% of the cost of a specific CFCC part is derived from the time consumed during pyrolysis.

Further, it has not been possible to utilize these prior procedures to include metallic elements as an integrally formed part of the finished ceramic product. This is due to the fact that the CVI and conventional PIP processes require such high temperatures to convert the preceramic to the finished ceramic product that metallic elements processed therewith are adversely affected.

Also in the case of CVI processing, the pyrolysis atmosphere contains corrosive gases, such as HF and HCl, which corrode all but the most corrosion resistant metal elements.

A particular problem encountered with tubular metal items such as gun barrels is that their service life is limited by erosion, which degrades the weapon's performance. The high temperature and pressure which results when firing the weapon, together with the aggressive nature of the propellant combustion products, combine to produce thermochemical erosion in the chamber, while friction caused by the exiting projectiles, particularly tracer rounds, induces mechanical erosion in the rest of the barrel and muzzle. These operating conditions often cause failure of the gun barrel due to thermal expansion of the metal, causing rupturing and/or distortion so as to make the barrel unusable.

SUMMARY OF THE INVENTION

The present invention overcomes the problems of the prior art and provides for the co-processing (integral forming) of tubular metallic elements and fiber performs infiltrated with a ceramic precursor to form hybrid metal/ceramic composite products without degradation of the metallic element, regardless of its composition.

Briefly stated, the present invention comprises the method of making a ceramic/metal composite containing at least one tubular metal element comprising associating a polymeric ceramic precursor having a lower thermal expansion than that of the metal element containing at least one susceptor to form a preceramic composite, and subjecting said composite to high frequency microwave radiation, preferably in the form of a beam, until the polymeric preceramic precursor is converted into a ceramic. The tubular members can be gun barrel or tubular members used in certain industrial manufacturing processes that are exposed to high internal pressure and/or elevated temperatures that can damage the same.

The invention also comprises the resultant products which are ceramic composites having tubular metallic elements integrally formed therewith as hereinafter described.

In this process, the fiber acts as a susceptor, and becomes hot when exposed to HFMW radiation. The hot susceptor in turn induces the conversion of the preceramic polymer to ceramic. Other material additives, such as powders, flake, whiskers, and chopped fibers, can be employed as susceptors if they are found to posses the required dielectric properties (e.g., dielectric constant, loss tangent, etc. as known to those skilled in this art). Silicon carbide and certain forms of carbon have been found to function adequately as susceptors; however, any material with the appropriate dielectric chemical and physical properties as, again, known to those skilled in this art can be used, may be employed.

DETAILED DESCRIPTION

While the instant invention can be carried out with any known preceramic polymer loaded with any known susceptor associated with a formed tubular metallic element in a microwave-permeable mold, such as one made of glass, it is preferred to utilize a shaped fiber reinforcement infiltrated with a polymeric ceramic precursor and a gun barrel, and the invention will be further described in connection therewith.

Suitable in this invention are continuous SiC fiber, chopped SiC fiber, milled SiC fiber, SiC whiskers, SiC particulate, SiC flake, and other forms of SiC found to be effective susceptors or materials to form fiber reinforcements through analysis or routine experimient.

Also suitable are continuous carbon or "graphite" fiber, chopped carbon or "graphite" fiber, milled carbon or "graphite" fiber, carbon or "graphite" whiskers, carbon or "graphite" particulate, carbon or "graphite" flake, and other forms of carbon and graphite found to be effective susceptors or materials to form fiber reinforcements through analysis or experiment. It is preferred to use pre-impregnated fabrics formed of such materials, although braiding of the fibers about the gun barrel can also be utilized. The manner of placing the fiber-reinforced pre-ceramic about the gun barrel is any known such as the lay-up or convolute or lay-up processes. The convolute process is also referred to as a "jellyroll" wrap and this technique is used to produce fishing rods and golf shafts.

Figure 1:
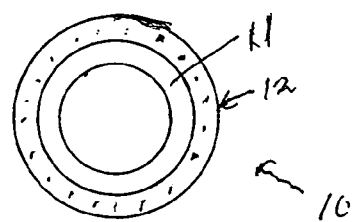
FIG. 1 is a cross-sectional view of a gun barrel of the present invention.

FIG. 1 illustrates a tubular composite 10 having an inner metallic layer 11 and an outer fiber-reinforced ceramic layer 12.

Further, while the instant invention is applicable to any metal or metal alloy that can conduct electricity in a metallic fashion, such as steel, copper, iron, aluminum, niobium, rhenium, Inconel alloys, tantalum, Stellite, vanadium and molybdenum, it will be particularly described in connection with a steel alloy used in guns (5 Cr—Mo—V).

The CFCCs are any conventionally used and known in this art. Examples include silicon carbide fiber reinforced silicon carbide matrix (SiC/SiC) composites, silicon carbide fiber reinforced silicon nitride (SiC/$Si_3N_4$) matrix composites, carbon fiber reinforced silicon carbide matrix (C/SiC) composites, and similar materials. The silicon carbide fibers used as reinforcement may be taken from the Sylramic™, Nicalon™, or Tyranno™ family of silicon carbide fibers, or similar silicon carbide products. The carbon fibers used as reinforcement may be taken from the Thornel™ or Panex™ family of carbon fibers, or similar carbon or graphite products. The silicon carbide matrix can be derived from allylhydridopolycarbosilane, methylpolycarbosilane, or other polymeric precursors such as a polysilazane, to silicon carbide used alone or in a blend or combination. If other matrix materials are desired, inorganic, organometallic, or hybrid polymers, including sol-gel ceramic precursors, that have been shown by experiment (e.g., pyrolysis with a conventional furnace) to yield the desired matrix on pyrolysis may be employed. In the description that follows, the invention will be further described in combination with silicon carbide fiber reinforced silicon carbide matrix composites; however, this description is provided as illustration only and is not intended to limit the potential application of the invention.

In addition, the apparatus used to generate the HFMW energy in the form of a beam is the GYROTRON. This known apparatus produces HFMW radiation ($\geq 20$ GHz) in the form of a beam similar to a laser, but with a larger irradiation area. The GYROTRON is a highly specialized, but commercially available, device that contains lenses and mirrors that transmit the energy as a quasi-optical beam to focus the energy and steer it. For small to medium-sized parts, the focusing and steering can steer the energy to cover the part completely and simultaneously. For larger parts, mirrors can be used to sweep or raster the energy over the part. Moreover, the energy can be pulsed or gated to control the rate at which the part is heated to form the final hybrid ceramic composite. The optimum energy level utilized, heating rate, and other parameters for any particular given combination of metal and ceramic precursor and fiber reinforcement can be determined by routine experimentation utilizing the GYROTRON.

In carrying out the process of the present invention, the preceramic composite is formed in the conventional manner, such as use of the conventional and known PIP methodology, to combine the metal element with the preceramic composite. It is an important and essential element of the present invention that the fiber-reinforced ceramic be load bearing and this is accomplished by ensuring that it have a lower thermal expansion than the metal used to form the inner liner of the barrel. This ensures that the metal gun barrel in the finished hybrid will be placed into a state of compression as the temperature of the metal increases during firing of the weapon. Thus the fiber-reinforced ceramic is not merely a thermal barrier, but is load bearing; i.e., it can actually carry the load (hoop stresses) that result from the rapidly expanding gases which force the propellant down the tube. The metal portion of the barrel is only present to facilitate "rifling" of the barrel and to ensure a hermetic seal.

The gun barrel design particulars are selected with the aid of computational methods such as the BARREL code and related computational algorithms cited in Wung et al, "Advanced Material Gun Systems: Design and Analysis" Material Sciences Corporation Report on SACO Defense Purchase Order 101902, June 1989. These computational methods take the various (known) properties of the article constituents (in this case, fiber, matrix and metal), such as strength, modulus, CTE, thermal conductivity, fiber size, dernier (a measure of the fiber size and number of fibers in a yarn (aka "tow")) and project certain properties of the processed article based on candidate fiber reinforcement geometries, as illustrated in FIG. 4 of the report. Examination of different plots and knowledge of the critical features required in the present invention enables one to select a fiber reinforcement geometry that represents a good compromise between all the various critical parameters of the final, processed gun barrel.

While the selection of the metal, matrix and fiber can be guided to some extent by computational studies, certain basic criteria can be defined without computational assistance. First, the materials must be amenable to use in the PIMP process. The fiber must be heated effectively by high frequency microwave radiation, and the metal should be unaffected. The fiber's dielectric constant, loss tangent and electrical conductivity must be in the appropriate ranges, but should be verified by irradiation of the fiber alone at the desired frequency. Likewise, the metal should be unaffected (not be heated) by the high frequency microwave radiation. The effect of the candidate frequency on the metal can be predicted by the metal's electrical conductivity and other parameters, but should also be verified by test.

For applications requiring the containment of internal pressure at elevated temperature, it is highly desirable that the inner metallic member be placed into a state of compression as the temperature of the article increases. This is accomplished by selecting a fiber-reinforced ceramic that exhibits less thermal expansion than the candidate metal. If the desired ceramic composite has been predetermined due to other criteria, this can be accomplished by selecting a metal that exhibits more thermal expansion than the ceramic composite.

For certain applications, such as a gun barrel, it is desirable to use a fiber reinforcement geometry that enhances or facilitates transfer of heat away from the inner member. For other applications, such as chemical process pipe, a geometry may be desired that inhibits transfer of heat away from the inner member so that the contents of the inner member can be maintained efficiently at elevated temperature with minimal energy expenditure.

The optimum parameters can be determined from the foregoing by routine experimentation.

In addition to being load bearing, the ceramic has very high thermochemical stability, and so can reach much higher temperatures, enabling the operator to discharge the weapon using much more rapid firing sequences and/or discharges of greater continuous duration before the barrel sustains damage. It also has enhanced thermal conductivity in comparison to thermal barrier coatings (TBCs). This property allows the heat generated at the breech to dissipate throughout the mass of the barrel, and for the more effective transfer of heat from the barrel to the atmosphere through radiation, conduction, and other known mechanisms.

Figure 2:
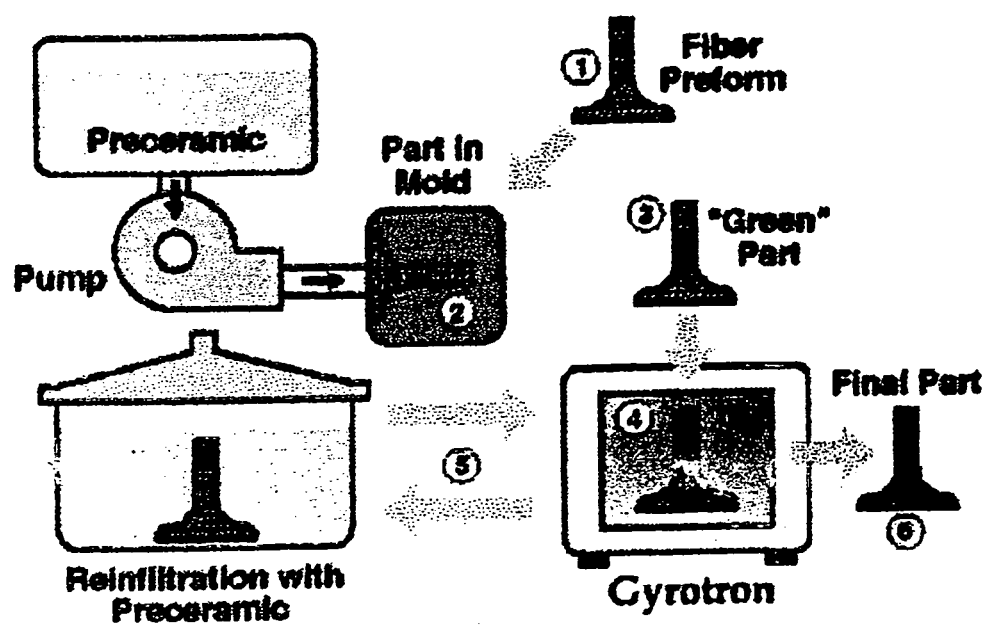
FIG. 2 is a block drawing of a method of making fiber-reinforced hybrid/metallic composites in accord with the present invention.

In the process as illustrated in FIG. 2, a preceramic polymer is used to saturate a reinforcing fiber preform, 1 in a mold 2, which preform is in the "green" part having the shape desired for the final desired ceramic composite. The metallic element can be integrated into the fiber perform before or after the preform is saturated with matrix precursor resin using conventional polymer composite or plastic fabrication methods, such as vacuum bag/autoclave, resin transfer molding, press molding, and the like.

However, instead of using the conventional ovens used in PIP methodology, the GYROTRON 4 is used for pyrolysis that converts the cured fiber-reinforced preceramic to the final part, a hybrid ceramic composite 6. To obviate any damage to the metallic element(s) that may arise while in the GYROTRON, the metallic element(s) can be grounded. Because properly grounded metals reflect GYROTRON energy, the metallic elements are heated only indirectly by the hot ceramic and do not reach the higher temperature of the ceramic.

Since the preceramic polymers used in the instant process do not contain corrosive elements, the pyrolysis atmosphere in the GYROTRON processing chamber is free of corrosive gases, such as the previously noted HF and HCl, that are present in CVI processing. Unlike the chemical precursors used in the CVI process, which are generally volatile halide compounds, such as $SiCl_4$ or $SiF_4$, that produce corrosive gases, such as hydrochloric or hydrofluoric acid, on pyrolysis, preceramic polymers are free of halogens, and their pyrolysis products are generally not corrosive, or substantially less so. In addition, the slow pace of the CVI process requires that the metals remain in the corrosive environment at high temperature for extended periods of time. In the instant invention, high temperatures are sustained only for short periods, and the short time at high temperature is spent in a very substantially less corrosive environment.

As in other procedures, repeated exposure of the composite to the HFMW energy beam in the GYROTRON, coupled with repeated infiltrations with the selected preceramic polymer, can be carried out to densify the composite it desired and to the degree desired.

As previously noted, the metallic element(s) need not be grounded prior to exposing the composite to the GYROTRON beam, but it can be grounded if for any particular composite it is found that the metallic element is being unduly heated during processing.

The invention will be further described in connection with the examples that follow and which are set forth for purposes of further illustration only.

EXAMPLE 1

Composite gun barrels were made utilizing four metallic materials. These included a steel alloy used in guns (5CR—Mo—V), molybdenum (TZM), niobium, and rhenium. Six different ceramic braids included a ±80° Sylramic/CVI SiC, a ±80° Nicalon/CVI SiC, ±80° T300/CVI SiC, 0/±80° Sylramic/CVI SiC, 0/±80° Nicalon/CVI SiC, and 0/±80° T300/CVI SiC. All the composites assumed a fiber volume fraction of 50%. 0 represents the axial direction and therefore ±80° is hoop dominant fiber orientation.

These gun barrels were tested for thermal and structural results as were gun barrels made completely of a steel alloy used in making guns. The best thermal results were obtained utilizing the 0.00 inch ±80° Sylramic/CVI SiC overwrap configuration.

Structural results showed that at the test temperature attained, the all steel barrels deform plastically. The steel liner in the hybrid steel/ceramic barrels would also deform plastically under the same thermal conditions, but the lower thermal expansion of the ceramic outer layer supplies the mechanical strength to keep the steel from deforming.

It was also found that in the most effective steel liner design, the steel liner is replaced by ones made of tantalum or satellite. Better results are obtained since these alloys exhibit superior wear and/or thermal capacity.

The results show that the superior results of the hybrid metal/ceramic gun barrels is primarily due to the lower thermal expansion of the braided ceramic matrix outer jacket which results in the necessary hoop tensile properties thereof.

EXAMPLE 2

It has been found with certain carbon compounds that not enough heat is generated to satisfactorily convert the preceramic polymer to a ceramic. In such cases, a sacrificial overcoat can be utilized.

The gun barrel, prepared as in Example 1 but before being placed in the GYROTRON, is infiltrated with VL20 polysilazane (a preceramic resin) by standing in liquid resin, under vacuum, for several hours. The barrel is removed from the liquid and allowed to drip drain before being sealed in a vacuum bag. The assembly is placed in an autoclave and cured at 200° C. for four hours with an applied overpressure of 100 psi.

The cured barrel is then reintroduced to the liquid VL20 to coat the outer surface. A partial, gel-stage, cure is preformed on the barrel by placing in a preheated vacuum oven, above 130° C., for several minutes. The gel-stage barrel is brought into physical contact with Silicon Carbide grinding media (size range: 2 micron to 60-grit) by dusting the surface or pressing and rolling the barrel in an excess of material. Performing a final cure completes the overcoat. This can be achieved in the autoclave as previously discussed or freestanding in a vacuum oven at 200° C.

The barrel is fired normally with the microwave beam coupling strongly to the overcoat, which immediately achieves a very high temperature. Heat is transferred into the preceramic/fiber composite via conduction through direct contact with the overcoat. This produces a char within the surface layers that also couple with the microwave thereby creating a pyrolysis front moving into the composite. The overcoat can generally be removed easily after firing.

Several variations of this method exist. One variation is to replace the SiC media with a spiral wrapped layer of SiC fiber, for example, a Nicalon ceramic grade fiber, and can be done before VL20 infiltration.

A second variation consists of treating the metal surface with a SiC media or fiber layer before braiding the carbon fiber perform. This would allow coupling of the microwave beam at the metal composite interface forming a pyrolysis front moving toward the outer surface. In this situation the layer would not be sacrifical but, rather, integrated into the final composite.

A further variation comprises introducing SiC fiber or media during the braiding process. This would provide SiC throughout the thickness of the composite allowing the microwave beam to couple well within the volume of the material.

These methods can also be used in combination, such as applying SiC fiber to the outer surface, performing the infiltration cycle, and then treating with SiC media.

While the precise reasons are not completely understood, it is believed that the microwave beam utilized in the GYROTRON can pyrolyze the preceramic portion of the composite to a ceramic without adversely affecting the metal portion thereof and that this may be aided by the fact the fact that the processing chamber of the GYROTRON is lined with absorbent material (cement) which absorbs the excess and/or reflected microwave energy and mitigates any undue heating of the metal portion.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A method of making a tubular ceramic/metal composite comprising
    associating at least one tubular metallic element with a polymeric ceramic precursor having a thermal expansion lower than (said metallic element with! said at least one tubular metallic element to form a preceramic composites and
    subjecting said composite to pyrolysis by high frequency microwave radiation, until the polymeric ceramic precursor is converted into a ceramic having said at least one tubular metallic element integrally formed as part of said composite.

2. The method of claim 1 wherein the microwave radiation is in the form of a beam.

3. The method of claim 2 wherein the preceramic ceramic precursor is a fiber-reinforced fluid placed in a microwave-permeable mold loaded with a susceptor.

4. The method of claim 3 wherein the microwave radiation is at least about 20 GHz or greater.

5. The method of claim 1 wherein the tubular metallic element is grounded prior to exposure to high frequency microwave radiation.

6. The method of claim 1 wherein the susceptor is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite.

7. The method of claim 6 wherein the susceptor is a SiC.

8. The method of claim 1 wherein the tubular metallic element is made of any metal and/or metal alloy that can conduct electricity.

9. A method of making a tubular ceramic/tubular metal element composite comprising placing a fiber-reinforced fluid polymeric ceramic precursor having a lower thermal expansion than the tubular metallic element and loaded with a susceptor in a mold,
    associating therewith at least one tubular metallic element made of any metal and/or metal alloy that can conduct electricity to form a preceramic composite, and subjecting said composite to pyrolysis by microwave radiation of at least about 20 GHz for a time sufficient to convert said polymeric ceramic precursor to a ceramic having said at least one tubular metallic element integrally formed as part of said ceramic composite.

10. The method of claim 9 wherein the microwave radiation is in the form of a beam.

11. The method of claim 10 wherein said susceptor is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite.

12. The method of claim 11 wherein the susceptor is a SiC.

13. The method of claim 9 wherein the ceramic is densified by adding additional polymeric ceramic polymer thereto and
    again pyrolyzing the composite by said energy.

14. A method of making a tubular ceramic/tubular metal element composite comprising forming a fiber reinforcement infiltrated with a polymeric ceramic precursor having a lower thermal expansion than that of the tubular metallic element, associating at least one tubular metallic element therewith to form a preceramic composite, and subjecting said composite to pyrolysis by high frequency microwave radiation, until the polymeric ceramic precursor in said composite is converted into a ceramic having said at least one tubular metallic element integrally formed therewith.

15. The method of claim 14 wherein the microwave radiation is in the form of a beam.

16. The method of claim 15 wherein the microwave radiation is at least about 20 GHz or greater.

17. The method of claim 15 wherein the metallic element is made of any metal and/or metal alloy that can conduct electricity.

18. The method of claim 14 wherein said ceramic/metal composite is coated with at least one additional polymeric preceramic precursor and then pyrolized by said high frequency microwave radiation.

* * * * *

UNITED STATES PATENT AND TRADEMARK OFFICE
CERTIFICATE OF CORRECTION

| | | |
|---|---|---|
| PATENT NO. | : 7,153,465 B1 | Page 1 of 1 |
| APPLICATION NO. | : 10/764662 | |
| DATED | : December 26, 2006 | |
| INVENTOR(S) | : Stuart T. Schwab and Kevin W. Dudek | |

It is certified that error appears in the above-identified patent and that said Letters Patent is hereby corrected as shown below:

Page 1, please add the following paragraph after the first paragraph:
Col. 1 line 13

FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. M67854-10-C-1061 awarded by MARCOSYSCOM.

Signed and Sealed this

Thirteenth Day of February, 2007

JON W. DUDAS
*Director of the United States Patent and Trademark Office*